United States Patent

Suzuki et al.

[11] Patent Number: 5,936,694
[45] Date of Patent: *Aug. 10, 1999

[54] LIQUID CRYSTAL DEVICE AND PROCESS FOR PRODUCING SAME

[75] Inventors: Masaaki Suzuki, Yokohama; Noriyuki Nakai, Ayase; Masayuki Shimamune, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/637,034

[22] Filed: Apr. 24, 1996

[30] Foreign Application Priority Data

Apr. 26, 1995 [JP] Japan ................................ 7-102220

[51] Int. Cl.⁶ ..................... G02F 1/1345; G02F 1/1335
[52] U.S. Cl. ..................... 349/151; 349/108; 349/109
[58] Field of Search ..................... 349/106, 108, 349/139, 142, 143, 151, 152, 109

[56] References Cited

U.S. PATENT DOCUMENTS

| | | | |
|---|---|---|---|
| 5,142,392 | 8/1992 | Ueki et al. | 349/106 |
| 5,191,452 | 3/1993 | Sarma | 349/106 |
| 5,299,041 | 3/1994 | Morin et al. | 349/106 |
| 5,539,546 | 7/1996 | Koden et al. | 349/155 |
| 5,617,230 | 4/1997 | Ohgawara et al. | 349/108 |

FOREIGN PATENT DOCUMENTS

| | | | |
|---|---|---|---|
| 0338412 | 10/1989 | European Pat. Off. . | |
| 543658-A2 | 5/1993 | European Pat. Off. | 349/106 |
| 0558058 | 9/1993 | European Pat. Off. . | |
| 4-55022 U | 5/1992 | Japan . | |
| 5-241139 | 9/1993 | Japan | 349/106 |

OTHER PUBLICATIONS

Patent Abstracts of Japan, vol. 015, No. 487 (P–1286), Dec. 10, 1991 & JP 03 211524 A (Hitachi Ltd), Sep. 17, 1987, *abstract*.

Patent Abstracts of Japan, vol. 012, No. 071 (P–673), Mar. 5, 1988 & JP 62 210425 A (Hitachi), Sep. 16, 1987, *abstract*.

*Primary Examiner*—Tiep H. Nguyen
*Attorney, Agent, or Firm*—Fitzpatrick, Cella, Harper & Scinto

[57] ABSTRACT

A liquid crystal device is constituted by disposing a liquid crystal between a pair of substrates each provided with an electrode to provide an effective optical modulation region and a peripheral region. At least one substrate of the pair of substrates comprises an intermediate layer disposed between the substrate and the electrode in the effective optical modulation region and the peripheral region, and the electrode on the intermediate layer comprises a first electrode disposed at least in the effective optical modulation region and a second electrode disposed in the peripheral region. The first and second electrodes are separated from each other. The intermediate layer may preferably include a color filter, a light-interrupting layer and a coating layer.

33 Claims, 6 Drawing Sheets

LIQUID CRYSTAL DEVICE AND PROCESS FOR PRODUCING SAME

FIELD OF THE INVENTION AND RELATED ART

The present invention relates to a liquid crystal device, particularly a liquid crystal device equipped with a color filter, and a process for producing the liquid crystal device.

There has been known a liquid crystal device comprising a pair of substrates each provided with an electrode and a liquid crystal disposed between the substrates. The liquid crystal device performs optical modulation by applying a voltage to the liquid crystal to control the alignment (or orientation) of liquid crystal molecules. Particularly, liquid crystal display devices wherein the alignment of liquid crystal molecules is controlled by applying a voltage in accordance with image data (image information) to form a display image have drawn attention for use as flat panel displays in place of display devices using a cathode-ray tube (CRT). Of these devices, there has been actively developed a color liquid crystal panel including: a pair of substrates on one of which substrates is a color filter film portion comprising at least three color films of red (R), green (G) and blue (B); electrodes as light switches each corresponding to respective color films; and a liquid crystal disposed between the substrates.

Some embodiments of such a color liquid crystal device will be described with reference to FIGS. 1 and 2.

FIG. 1 shows an embodiment of a color liquid crystal display device 4 including a pair of substrates 41 and 41a disposed opposite to each other with a prescribed gap maintained by means of a spacer 46 and a liquid crystal 42 filling the gap and sandwiched between the substrates 41 and 41a. The device 4 has an effective optical modulation region a comprising a plurality of display pixels (picture elements) constituting a display region and also has a peripheral region b located outside of and in contact with the effective optical modulation region a. In the region a, a group of color filter films 43 comprising three color films containing corresponding colored resins of red (R), green (G) and blue (B), respectively and a flat (or even) layer or film 44 comprising a transparent resin as a main component for coating (or covering) the group of color filter films 43 and for flattening the resultant surface are successively formed on at least one of the substrates (on the substrate 41 in this embodiment). On the flat layer 44, a group of plural transparent electrodes 45 having a prescribed pattern corresponding to the display pixels in order to drive the liquid crystal display device is formed. On the other substrate 41a, a group of plural transparent electrodes 45a having a prescribed pattern corresponding to the display pixels are formed. In this embodiment, the display pixels are formed at intersections of the groups of transparent electrodes 45 and 45a constituting an electrode matrix. In the region a, a voltage is applied to the liquid crystal 42 (liquid crystal layer) through the groups of transparent electrodes 45 and 45a, whereby an alignment (orientation) state of liquid crystal molecules can be controlled to appropriately effect optical modulation, thus performing image display etc.

On the other hand, the peripheral region b is not a region contributing to optical modulation. In the region b, however, in order to provide good optical modulation characteristics in the above-described region a, the flat layer 44 is continuously formed on the substrate 41, i.e., extends from the region a to the region b, so that a gap between the substrates 41 and 41a to be filled with the liquid crystal is adjusted to be as uniform as possible in the regions a and b as a whole.

The substrates 41 and 41a are sealed with a sealing agent 47 acting as an end portion (in the region b in this embodiment).

FIG. 2 shows another embodiment of a color liquid crystal display device principally having a cell structure similar to that in FIG. 1. In FIG. 2, identical structural members (or elements) are indicated by identical reference numerals used in the device of FIG. 1 described above. In this embodiment, however, insulating films (alignment control films) 48 and 48a having been subjected to uniaxial aligning treatment are formed on the groups of transparent electrodes 45 and 45a, respectively, formed on the substrates 41 and 41a, respectively, in the effective optical modulation region a. Further, in the peripheral region b, in order to provide a gap between the substrates (i.e., a thickness of the liquid crystal layer) closer to that in the region a as in the device of FIG. 1 and in order to control an alignment state of liquid crystal molecules as in the region a, a color filter film portion 43a is formed on the substrate 41. On the color filter film portion 43a, the flat film 44 and insulating film 48 are successively formed and each continuously extends from the region a to the region b. On the other substrate 41a, the insulating film 48a which continuously extends from the region a to the region b is formed.

However, in the above-mentioned liquid crystal devices as shown in FIGS. 1 and 2, the gap between the substrates (i.e., cell gap or the thickness of liquid crystal layer) is not sufficiently uniform in the regions a and b as a whole, thus failing to effect uniform control of an alignment state of the liquid crystal molecules over the entire liquid crystal panel. Particularly, the alignment state in the vicinity of an end portion of the effective optical modulation region a is liable to become ununiform.

Further, the liquid crystal devices as shown in FIGS. 1 and 2 are liable to have defects resulting from an electrode substrate production process and materials used therefor.

More specifically, the production (or preparation) of respective substrates constituting the liquid crystal device, particularly that of the substrate 41 equipped with the group of color filter films, may be performed as follows. A group of color filter films 43 and 43a is formed on a substrate 41 (e.g., a sheet of flat glass) and then a flat film 44 is formed on the entire surface of the substrate 41 provided with the group of color filter films 43 and 43a as shown in FIG. 2. Thereafter, a film of an electroconductive transparent material (e.g., ITO film) is formed on the entire surface of the flat film 44 by, e.g., vacuum vapor deposition. On the electroconductive (transparent) film, a prescribed resist pattern as a mask is formed according to a photolithographic process, followed by etching to form a group of electrodes 45 having a prescribed pattern in a region corresponding to the effective optical modulation region a. Further, an insulating film 48 is formed on the entire electrodes 45, as desired.

In the etching step of the electroconductive transparent film in the above production process, a chlorine ion-containing solution, such as a hydroiodic acid-ferric chloride mixture solution or a hydrochloric acid-ferric chloride mixture solution is used as an etchant (etching solution). In this case, however, in the peripheral region b where the electroconductive transparent film is completely removed, chlorine ions in the etchant penetrate through the flat film 44 and the color filter film 43a disposed under the electroconductive transparent film to reach and remain at the surface of the substrate 41 during and after the etching step. On the other hand, sodium ions are provided on the substrate 41 in a heating step after the etching step, e.g., a hot (heat) curing step of forming an insulating film 48 as an upper layer or a heating step at 200° C. or above in the aligning treatment of a liquid crystal material. As a result, in the above heating step, the chlorine ion and the sodium ion react with each other to precipitate sodium chloride, whereby the flat film 44 and/or the color filter film 43a located lower than the electrode are liable to be peeled off. This phenomenon also adversely affects the layers formed in the effective modulation region a and those formed on the substrate 41a free from the color filter film in a case where some film or layer is formed under the electrode according to necessity.

In order to remedy the above difficulties, a high-purity glass plate having a low or zero impurity content (e.g., sodium content) has been tried as a substrate or a barrier layer formed under the color filter film or formed on the flat film to prevent the penetration of and reaction of the chlorine ion with the sodium ion.

However, at the present time, sufficient improvement has not attained and a complicated production process is necessitated, thus leaving room for improvement.

SUMMARY OF THE INVENTION

An object of the present invention is to provide a liquid crystal device, including a pair of substrates each provided with an electrode and a liquid crystal sandwiched between the substrate, providing a uniform gap or spacing between the substrates (i.e., cell gap or liquid crystal layer thickness) over the entire region of the device to allow the creation of a uniform and good alignment state of the liquid crystal molecules in the entire region and prevent peeling of a layer in a lamination layer structure of a substrate, particularly in a region other than an effective optical modulation region, and to suppress an occurrence of a defect in a resultant device, such as an alignment defect.

Another object of the present invention is to provide a process for producing the liquid crystal device described above.

According to the present invention, there is provided a liquid crystal device, comprising: a pair of substrates each provided with an electrode, and a liquid crystal disposed between the pair of substrates to provide an effective optical modulation region and a peripheral region, wherein
  at least one substrate of the pair of substrates comprises an intermediate layer disposed between the substrate and the electrode in the effective optical modulation region and the peripheral region, and the electrode on the intermediate layer comprises a first electrode disposed at least in the effective optical modulation region and a second electrode disposed in the peripheral region, the first and second electrodes being separated from each other.

According to the present invention, there is also provided a liquid crystal device, comprising: a pair of substrates each provided with an electrode, and a liquid crystal disposed between the pair of substrates to provide an effective optical modulation region and a peripheral region, wherein
  at least one substrate of the pair of substrates has an effective optical modulation region and a peripheral region including a first region and a second region disposed opposite to each other with respect to the effective optical modulation region, and
  the electrode on said at least one substrate has a first pattern in the form of stripes extending from the effective optical modulation region to a an outside portion via the second region to be connected with an external drive unit and has a second pattern in the first region apart from the first pattern.

According to the present invention, there is further provided a process for producing a liquid crystal device comprising a pair of substrates each provided with an electrode, and a liquid crystal disposed between the pair of substrates to provide an effective optical modulation region and a peripheral region; including the steps of:
  forming an intermediate layer on at least one substrate of the pair of substrates in the effective optical modulation region and the peripheral region, and
  forming on the intermediate layer an electrode having a first electrode pattern in the effective optical modulation region and a second electrode pattern in the peripheral region through a photolithographic process and an etching with an etchant.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
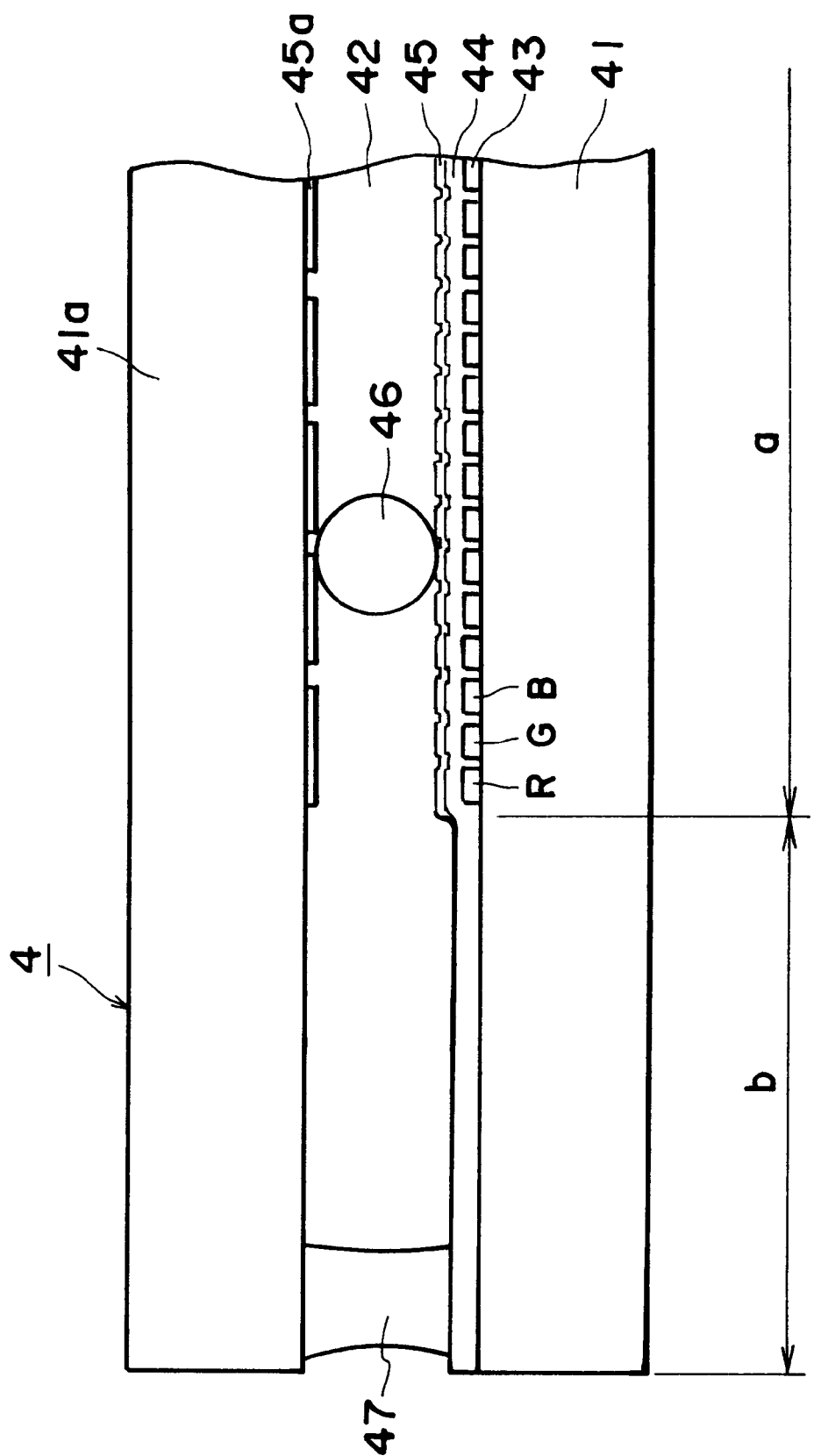
FIG. 1 is a sectional view of an embodiment of a liquid crystal device.
Figure 2:
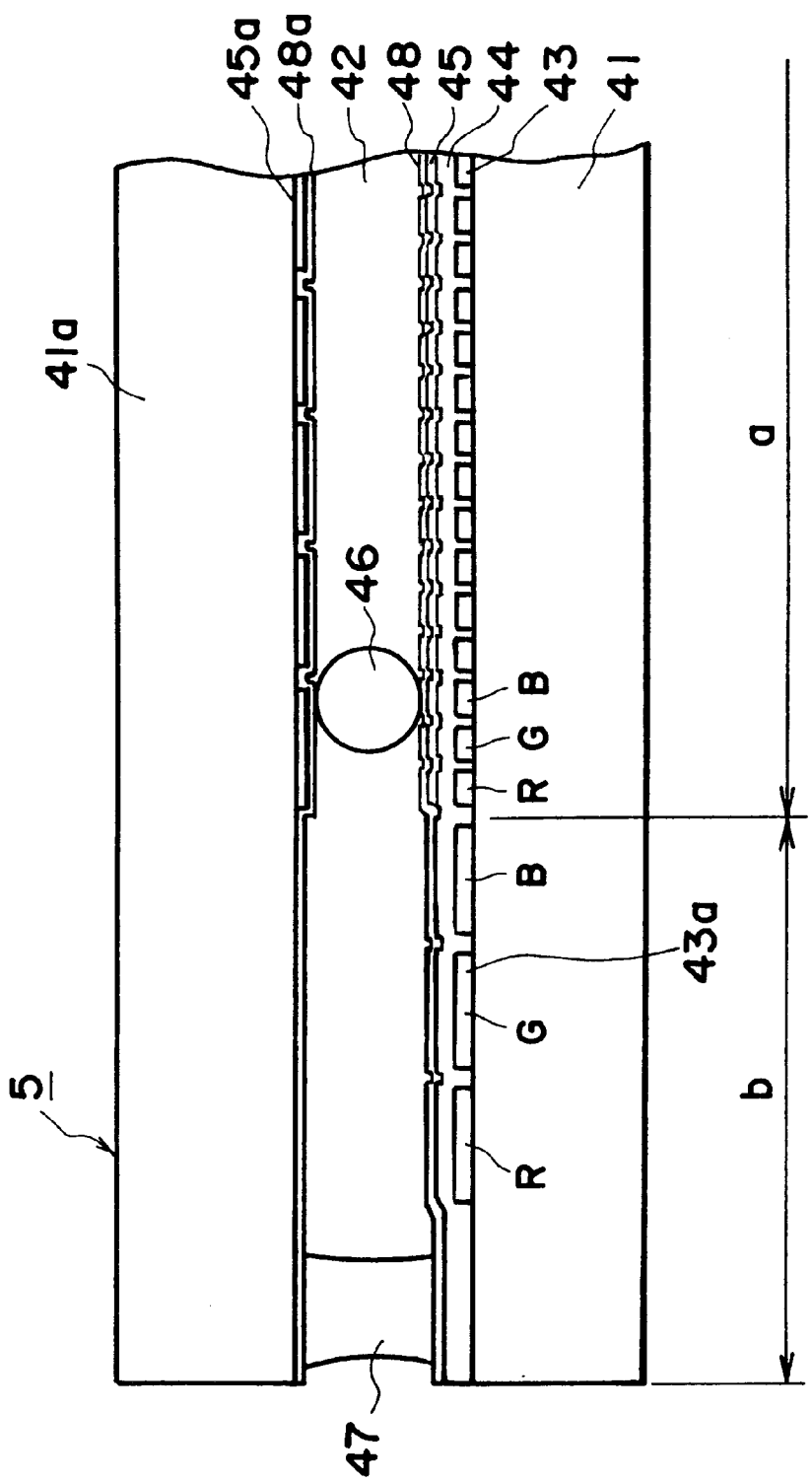
FIG. 2 is a sectional view of another embodiment of a liquid crystal device.

The liquid crystal device according to the present invention is characterized by providing at least one substrate with a first electrode group at least in an effective optical modulation region and a second electrode (group) in a peripheral region, whereby a cell gap is made uniform in the entire region where a liquid crystal material is filled and an alignment state of the liquid crystal material can be controlled uniformly in the entire region including the effective optical modulation region and the peripheral region.

The second electrode located in the peripheral region is apart (separated) from the first electrode located in the effective optical modulation region. In a preferred embodiment, the second electrode functions as a dummy electrode which is not actuated or supplied with a voltage, thus failing to contribute to control of alignment (orientation) direction (e.g., switching) of liquid crystal molecules. The second (dummy) electrode is effective in preventing an adverse influence of a short-circuit occurring in the peripheral region on the effective optical modulation region since the second electrode is separated (insulated) from the first (or display) electrode formed in the effective optical modulation region.

Herein "effective optical modulation region" means a display region having a prescribed display area in which a transmittance of a large number of pixels is controlled by using an applied drive signal to effect display in the case of a display device or means a region having a prescribed optical modulation area in which appropriate optical modulation is performed depending on drive signals in the case of a non-display device (a device other than the display device). Further, "peripheral region" means at least one region which does not substantially contribute to optical modulation (e.g., control of transmittance) and disposed outside the effective optical modulation region. The peripheral region may preferably comprise two regions opposite to each other across the effective optical modulation region. The peripheral region may more preferably enclose (surround) the effective optical modulation region on all (four) sides thereof.

In the liquid crystal device according to the present invention, an electrode (group) is formed in not only the effective optical modulation region but also the peripheral region. Taking a general (substrate) production process of the liquid crystal device into consideration, as a result, a layer of an electrode material formed in the above manner is patterned by a etching treatment in both regions to provide a prescribed pattern. In this instance, the thus patterned electrode is not removed by the etching treatment but remains in the peripheral region, whereby the penetration of a specific ion, e.g., a chlorine ion, contained in the etchant used in the etching treatment into the lower layer(s) closer to the substrate can be suppressed. Further, an adverse influence of a (peeling) solution for removing a resist pattern used in the above patterning step of the electrode upon the lower layer(s) can also be prevented. Even if an impurity ion, such as a sodium ion, is generated on the substrate surface in a post-treatment (e.g., hot curing of a resultant film or heating for aligning treatment of a liquid crystal), the impurity ion is prevented from reacting with an ion (e.g., chlorine ion) contained in the etchant, a thus preventing an occurrence of a defect, such as the peeling of the layer(s) located closer to the substrate.

In case where the liquid crystal device of the present invention is used as a display device, an electrode (first electrode) formed on a substrate in the effective optical modulation region may preferably have a prescribed pattern corresponding to display pixels. Similarly, an electrode (second electrode) formed on the (identical) substrate in the peripheral region may preferably have a prescribed pattern in view of, e.g., a capacity (or capacitance) between the substrates. In a more preferred embodiment, the electrode patterns in the above two regions may appropriately be formed to have the same or different shapes in view of a degree of control of, e.g., a gap between the substrates. Particularly, the second electrode formed in the peripheral region may preferably have a pattern having a size, with respect to each electrode segment, larger than that of a pattern of the first electrode formed in the effective optical modulation region in order to suppress the peeling of the second electrode. The above structural features of the (transparent) electrodes formed on the substrate(s) may also be applied to an auxiliary electrode optionally disposed on or outside of the electrodes in order to control a resistance of the electrodes as a whole (i.e., the auxiliary electrode(s) may be disposed both in the above two regions and may be patterned in a prescribed shape).

In the present invention, the liquid crystal device may preferably be a color liquid crystal display device.

An ordinary color liquid crystal display device includes a group of color filter films comprising color filter segments of red (R), green (G) and blue (B), and optional white (transparent) (W) as desired, each containing corresponding colored resins, respectively, in at least the effective optical modulation region (display region) on one of a pair of substrates. The color filter segments may appropriately be patterned and combined with each other to constitute one (display) pixel. On the patterned color filter films, a transparent (flat) layer for flattening an unevenness (irregularity) of the color filter films is formed, and thereon a pattern of a group of transparent electrodes comprising an electroconductive transparent material (e.g., ITO) is formed in accordance with one pixel or the color filter segment(s) constituting one pixel.

In the present invention, the color liquid crystal display device has a group of patterned transparent electrodes formed not only in the effective optical modulation region (display region) but also in the peripheral (non-display) region. In this case, also in the peripheral region, the group of patterned transparent electrode may preferably be formed via a group of color filter films as a dummy color filter and a transparent layer successively formed in this order on the substrate. The group of (dummy) color filter films may have a pattern similar to or different from that of the group of color filter films formed within the display region. However, the group of (dummy) color filter films formed in the peripheral region may preferably be patterned so as to have a size, with respect to each of color filter segments, larger than that of a pattern of the group of color filter films formed in the display region. In the above (plural)-layer structure on the substrate, the presence of the group of transparent electrodes in the display and peripheral regions is very effective in preventing the peeling of the group of color filter films and/or the transparent layer as described above.

In the present invention, a liquid crystal material may include a nematic liquid crystal, a smectic liquid crystal including a chiral smectic liquid crystal (e.g., a ferroelectric liquid crystal) and other liquid crystals. These materials may be used singly or in a mixture (composition) of two or more species.

The above liquid crystal is disposed between the pair of substrates with a prescribed cell gap. The above-mentioned layer structure on the substrate may suitably be applied to a liquid crystal device having a smaller cell gap. Particularly, a liquid crystal device using a chiral smectic (ferroelectric) liquid crystal is set to have a very small cell gap of at most 5 $\mu$m, preferably 0.5–2 $\mu$m, particularly about 1 $\mu$m, so that it is important to control uniformity of the cell gap. For this reason, the above layer structure, i.e., a layer structure wherein a group of color filter films, a transparent layer, and a group of transparent electrodes are formed in this order on a substrate in both of the effective optical modulation region and the peripheral region may preferably be adopted in the present invention.

Hereinbelow, some preferred embodiments of the liquid crystal device according to the present invention will be described with reference to FIGS. 3A–6 in which identical structural members and regions are indicated by identical reference numerals.

Figure 3:
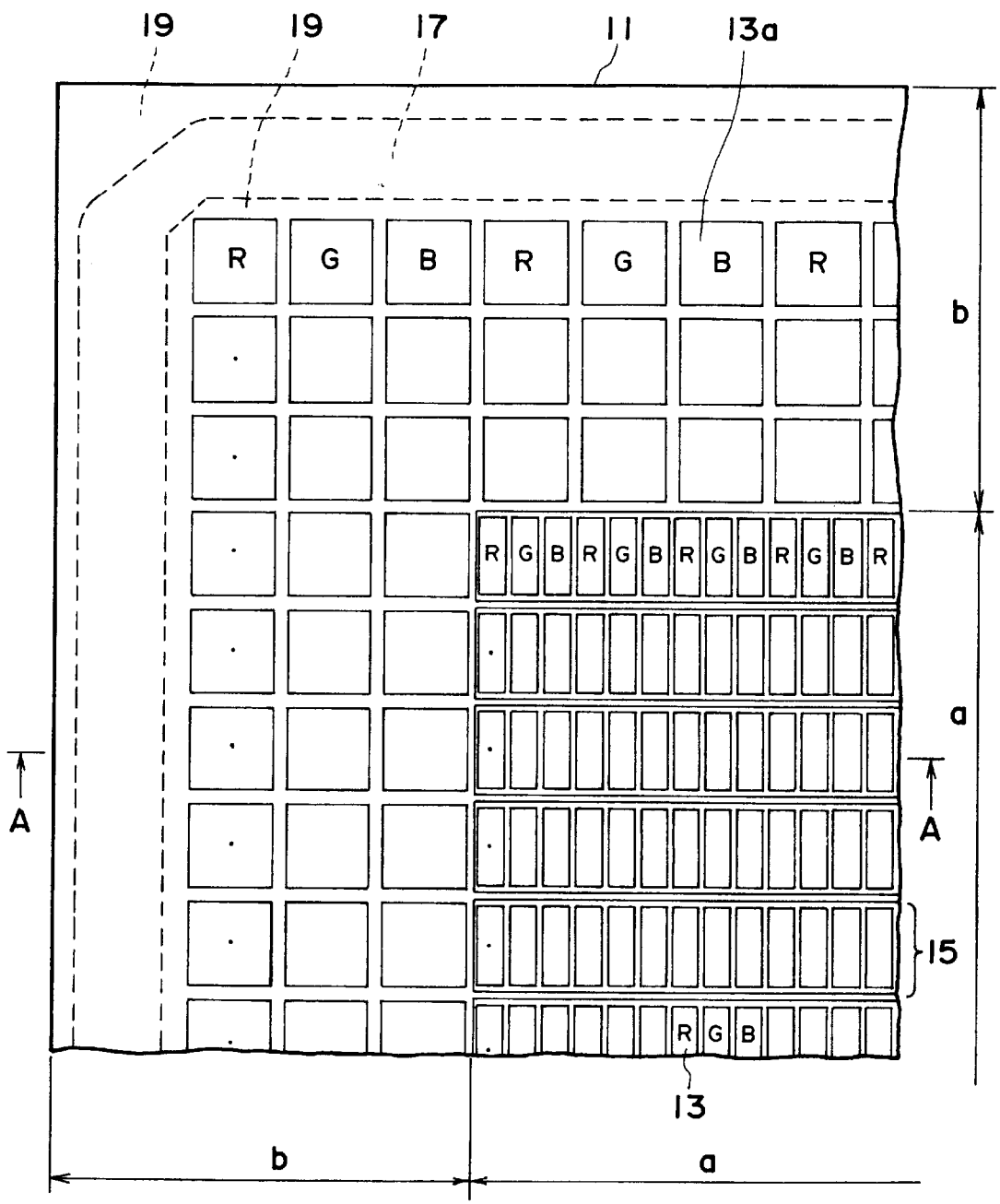
FIGS. 3A, 3B are plan view of a liquid crystal device according to a first embodiment of the present invention.
Figure 4:
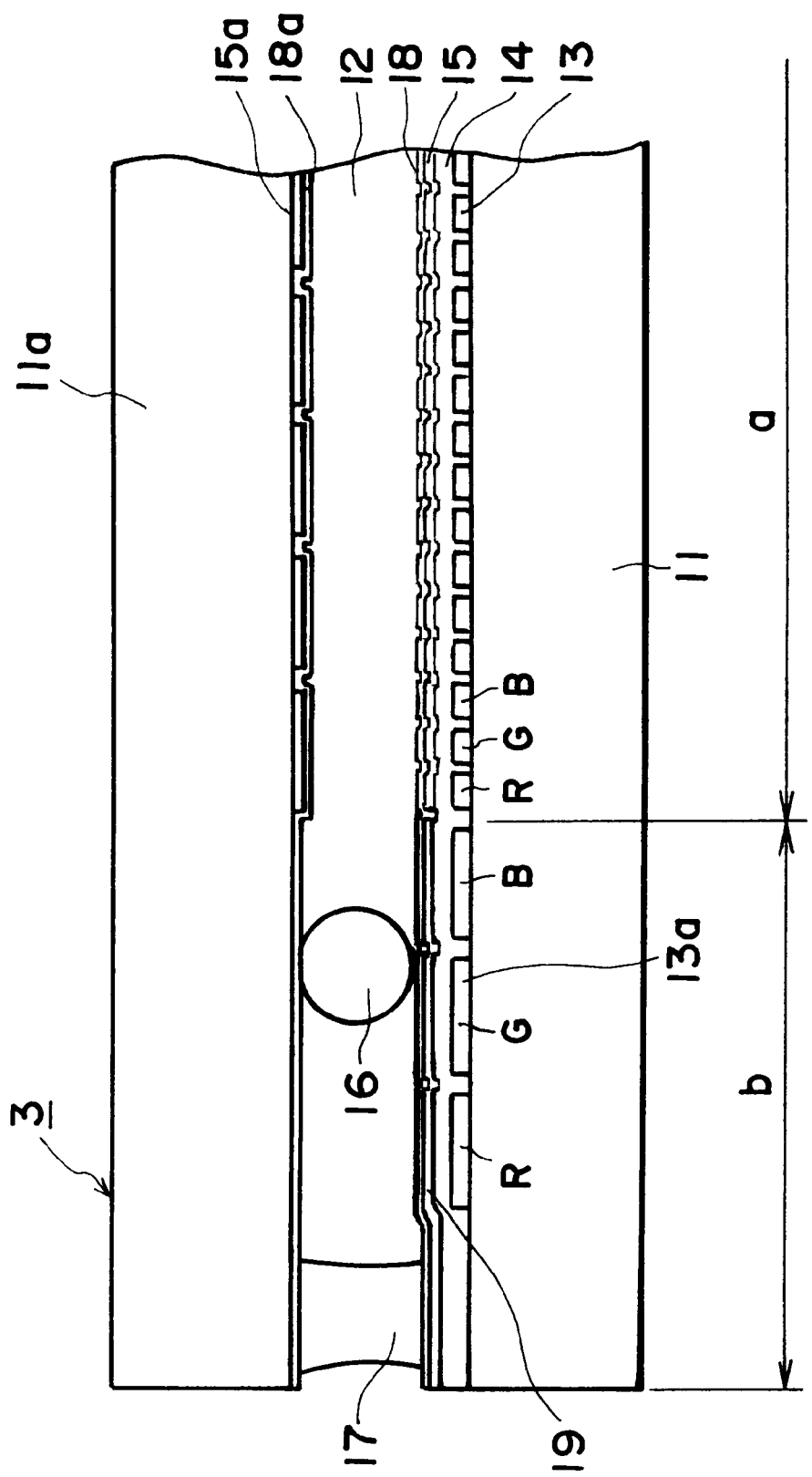
FIG. 4 is a sectional view of the liquid crystal device taken along line A—A in FIG. 3.

FIGS. 3A, 3B and 4 show a first embodiment of the liquid crystal device of the present invention, wherein FIG. 3A is a plan view of one substrate and FIG. 4 is a sectional view of the entire device structure taken along line A—A in FIG. 3A.

Referring to FIGS. 3A, 3B and 4, a liquid crystal device 3 includes a pair of substrates 11 and 11a each comprising a sheet (or flat) glass. On one substrate 11, a group of color filter films 13 comprising color filter segments of red (R), green (G) and blue (B) each containing respective colored resins is formed in a region corresponding to an effective optical modulation region (display region) a and a group of color filter films 13a comprising color filter segments (R, G and B) is formed in a region which corresponds to a peripheral region b but is inside the periphery of the device where the two substrates 11 and 11b are sealed with a sealing agent 17. Examples of a material for the color filter films may include a photosensitive resin (e.g., polyamide or polyimide) containing pigments for respective colors dispersed therein. The group of color filter films 13a (in the peripheral region b) has a dummy pattern different from a pattern of the group of color filter films 13 (in the display region a) in this embodiment but may have a dummy pattern identical to a pattern of the group of color filter films 13. On the group of color filter films 13 and 13a, a coating (flat) layer 14 comprising a transparent resin is formed to flatten or smooth an unevenness (irregularity) in thickness (height) of respective color filter segments (R, G and B) or recesses therebetween. On the coating layer 14, a group of transparent electrodes 15 in the form of stripes for applying a voltage to a liquid crystal layer is formed in the display region a and a group of transparent electrodes 19 is formed in the peripheral region b and extends to the edge of the substrate 11. The group of transparent electrodes 19 is apart (separated) from the group of transparent electrodes 15 so as not to contribute to driving the device. On the groups of transparent electrodes 15 and 19, an insulating film 18 comprising a polymeric material or an inorganic material and subjected to uniaxial aligning treatment (e.g., rubbing) is formed.

On the other substrate 11a, a group of transparent electrodes 15a in the form of stripes is formed in the display region a. Further, on the group of transparent electrodes 15a and the substrate 11a, an insulating film 18a (similar to the insulating film 18) is formed.

Between the opposite insulating films 18 and 18a, a spacer 16 is disposed to provide a prescribed cell gap filled with a liquid crystal 12.

In this embodiment, on the substrate 11, a light-interrupting layer may appropriately be disposed in the display region a in a prescribed pattern between or among a prescribed number of color filter segments 13 at the same level in order to prevent unnecessary color mixing therebetween. The light-interrupting layer may preferably extend to the peripheral region. Further, in order to lower a resistance of the respective transparent electrodes 15 and 15a, an auxiliary electrode (e.g., comprising a metal material) may be formed on a part or all of the surface of the electrodes 15 and 15a in a prescribed pattern.

The group of transparent electrodes 15 is electrically connected with an external drive unit, such as a driving IC (integrated circuit) disposed outside of the device 3 (not shown in FIGS. 3 and 4). In this case, the respective stripe electrodes 15 may be connected with a driving IC on the same side or on different sides from each other. Further, on the side where each stripe electrode 15 is connected, the stripe electrode 15 is also formed in the peripheral region b, but is not connected with a corresponding transparent electrode 19 apart from the stripe electrode 15, the transparent electrode 19 being disposed in the opposite peripheral region b. For this reason, the electrodes 15 and 19 formed on the same substrate 11, as a whole, provide a uniform cell gap between the substrates 11 and 11a over the regions a and b.

In this embodiment, the respective structural members (elements) are formed or prepared as follows.

Each of the group of color filter films 13 and 13a disposed in the regions a and b, respectively, is formed on the glass substrate 11 in the following manner.

First, a solution containing a color filter-forming material principally comprising a photosensitive resin for one color filter (e.g., red) is applied onto the substrate 11 and pre-dried (pre-baked) on a hot plate. Then, the resultant substrate 11 is subjected to photo-curing (or -setting) (exposure with light) with a photomask to cure a necessary part (exposed part) of the photosensitive resin, followed by removal of an unnecessary part (unexposed part) of the photosensitive resin through development. The thus treated substrate 11 is further subjected to curing (post-baking) with the hot plate to obtain a single color (e.g., red) color filter film. The above steps are repeated two times with respect to photosensitive resins for the remaining two color filters (e.g., green and blue), respectively, in this order, and optionally repeated with respect to a photosensitive resin for a white (transparent) color filter, as desired, to provide an objective group of color filter films comprising color filter segments of at least three colors (red (R), green (G), blue (B) and optional white (W)) to the substrate 11.

Then, in order to flatten the difference in height among respective color filter segments and fill the spacing therebetween, a solution containing a transparent resin is applied onto the above prepared substrate 11 by spinner coating and dried and cured (baked) with the hot plate to form a coating (flat) layer 14 on the above substrate 11.

Thereafter, an electroconductive transparent film (e.g., ITO film) is formed on the entire surface of the coating layer 14 by using a vacuum film-forming apparatus. Subsequently, a photoresist having prescribed pattern (as a photomask) is formed on the electroconductive transparent film by a photolithographic process and subjected to etching with an etchant containing, e.g., chlorine ions, such as a mixture solution of hydroiodic (or hydrochloric) acid and ferric chloride, followed by peeling-off of the photoresist to form a group of transparent electrodes 14 (e.g., in the form of stripes) in the display region a (and partially in the peripheral region b) and a group of transparent electrodes 19 (e.g., in the form of stripes) in the peripheral region b.

Then, an insulating film 18 comprising at least one layer is formed at least on the electrode 15 by using a vacuum film-forming apparatus or according to printing process, optionally followed by uniaxial aligning treatment, such as rubbing.

On the other hand, a group of transparent electrodes 15a and an insulating film 18a are successively formed on the other substrate 11a in the same manner as above.

The thus prepared two substrates 11 and 11a are oppositely applied to each other via a spacer 16 by using a sealing agent 17 at the periphery thereof so as to leave an injection port of a liquid crystal. A liquid crystal 12 is then injected into a cell gap (a gap between the substrates 11 and 11a) through the injection port, followed by sealing of the injection port. Thereafter, a resultant liquid crystal cell is subjected to aligning treatment including heating to prepare a liquid crystal device according to this embodiment as shown in FIG. 4.

More specifically, the above liquid crystal device (as shown in FIG. 4) is prepared by using the following structural members and under the following conditions.

Substrate (11, 11a): sheet (or flat) glass (thickness=1.1 mm)

Color filter film (13, 13a): three color filter segments of R, G and B (thickness=c.a. 2 $\mu$m)

Coating film (14): transparent resin (thickness=c.a. 3 $\mu$m)

Transparent electrode (15, 15a, 19): ITO film (thickness= c.a. 0.1 $\mu$m)

Liquid crystal (12): chiral smectic liquid crystal (mixture)

Cell gap: 1.1 μm (average value)

Etchant used: hydrochloric acid/ferric chloride mixture solution (3/2 by volume)

Aligning treatment (of liquid crystal): including heating for 1 hour at 270° C.

The above-prepared liquid crystal device according to this embodiment did not experience a peeling phenomenon of the transparent layer 14 and the color filter films 13 and 13a at all and provided no alignment defect even at the boundary between the display (effective optical modulation) region a and the peripheral region b.

Figure 5:
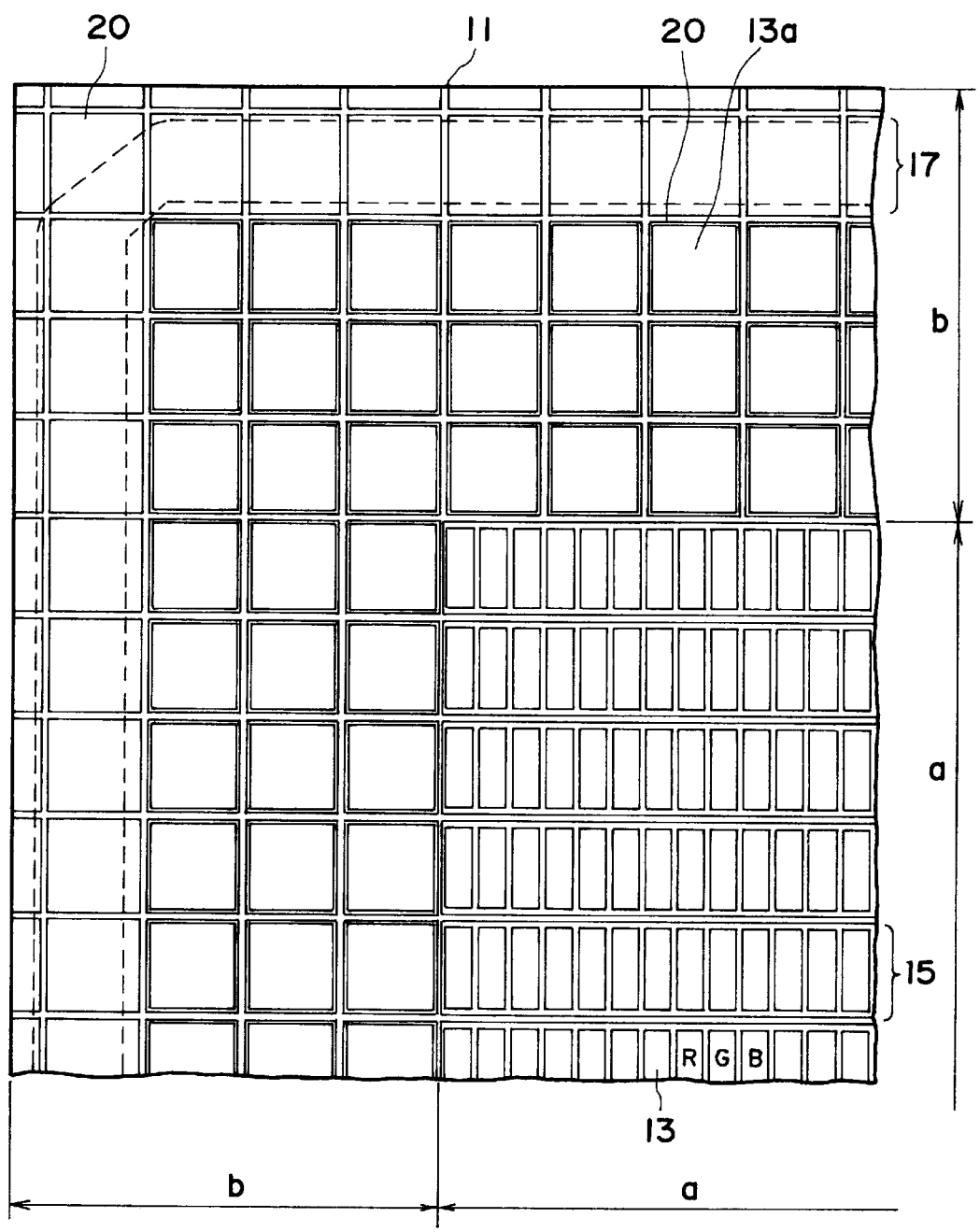
FIG. 5 is a plan view of a liquid crystal device according to a second embodiment of the present invention.

With reference to FIG. 5, a second embodiment of the liquid crystal device of the present invention will be described.

Referring to FIG. 5, a liquid crystal device according to this embodiment has the same cell structure as that of the first embodiment (FIG. 3) except that a group of transparent electrodes 20 is patterned in the form of independent squares each having a size slightly larger than that of each color filter segment 13a. Similarly as in the first embodiment, the liquid crystal device in this embodiment also has a uniform cell gap over the entire region (including the regions a and b). Further, in both regions a and b, the liquid crystal shows a uniform alignment state.

A liquid crystal device having the above-described structure as shown in FIG. 5 was prepared in the same manner as in the first embodiment except for using an etchant (for patterning transparent electrodes) comprising a mixture solution (hydroiodic acid/ferric chloride=3/2 by volume).

As a result, similarly as in the first embodiment, peeling of the coating film 14 and the color filter film 13a liable to be caused in the peripheral region b was not observed at all and excellent display characteristics were confirmed.

Then, a third embodiment of the liquid crystal device according to the present invention will be explained with reference to FIG. 6.

Figure 6:
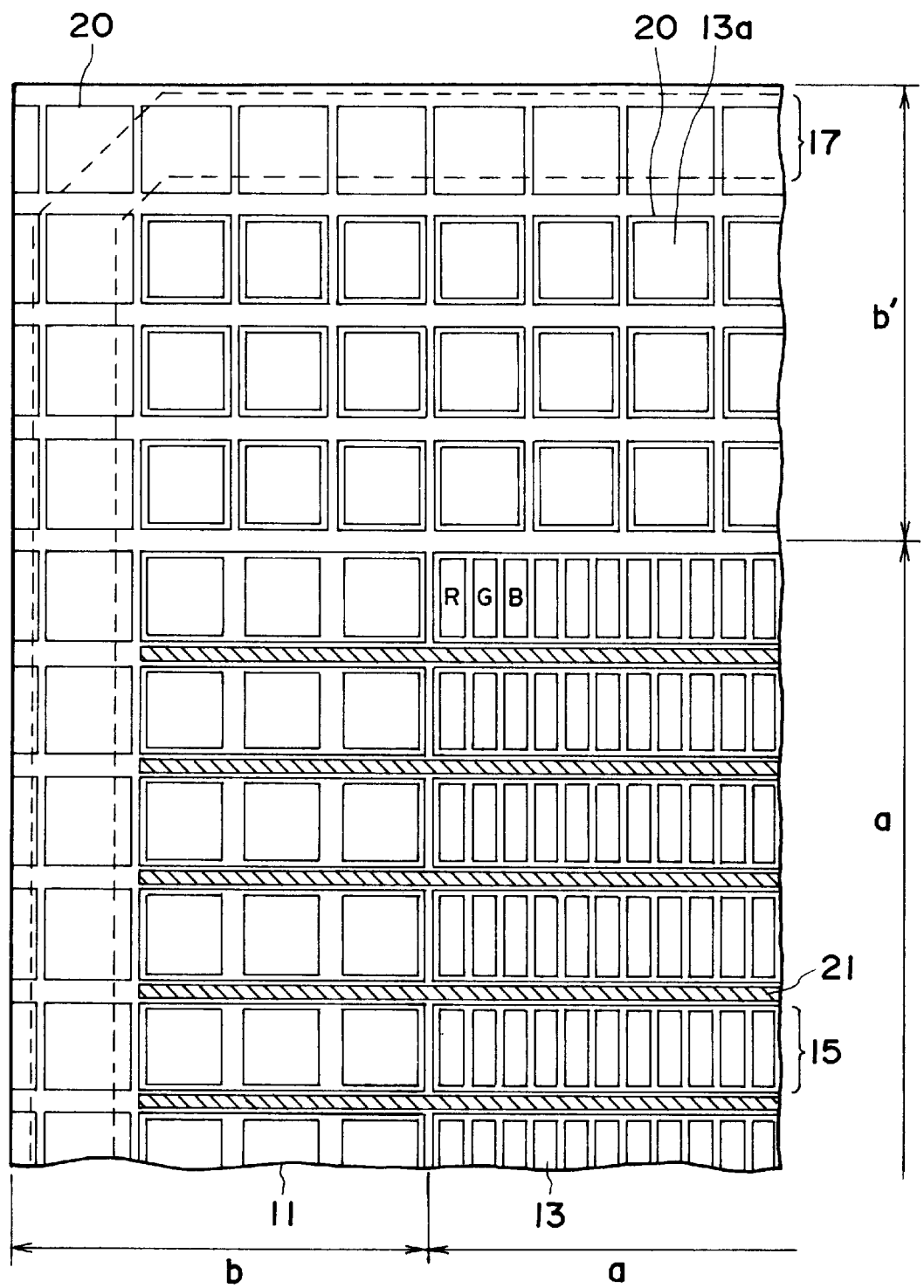
FIG. 6 is a plan view of a liquid crystal device according to a third embodiment of the present invention.

Referring to FIG. 6, a liquid crystal device according to this embodiment has the same cell structure as that of the second embodiment (FIG. 5) except that a light-interrupting layer 21 in the form of stripes as shown in FIG. 6 is disposed between the color filter films 13 in a region corresponding to a space between the stripe transparent electrodes 15 in the region a and partially between those 20 in the region b and that a group of transparent electrodes 20 are partially patterned in the form of independent squares similar to those in FIG. 5 but having a larger spacing in a region b' and partially patterned in the form of stripes (each including three squares in the figure) in the region b but in a region adjacent to a region corresponding to the region where the light-interrupting layer 21 is formed. In this embodiment, similarly as in the first and second embodiments, the liquid crystal device has a cell gap with a good uniformity in not only the display region a but also the peripheral regions b and b'. Further, in these regions a, b and b', the liquid crystal shows a uniform alignment state.

A liquid crystal device having the above-described structure was prepared in the same manner as in the second embodiment except that a light-interrupting layer 21 having a thickness of about 1000 Å was additionally formed by using an alloy of Mo—Ta.

As a result, similarly as in the second embodiment, peeling of the coating film 14 and the color filter film 13a liable to be caused in the peripheral regions b and b' was not observed at all and excellent display characteristics were confirmed.

As described hereinabove, according to the present invention, there is provided a liquid crystal device having a uniform cell gap and showing a good display characteristic free from defects by providing at least one substrate with a first electrode in an effective optical modulation region and a second electrode in a peripheral region separated from each other.

Particularly, in a color liquid crystal display device including a color filter film and a coating layer thereof and optionally a light-interrupting layer, the above electrode arrangement is more effective in improving a display quality by suppressing peeling of the color filter film and the coating layer particularly in the peripheral region and providing a uniform liquid crystal layer thickness.

What is claimed is:

1. A liquid crystal device, comprising:

first and second substrates disposed opposite to each other so as to provide a rectangular cell structure having four sides, the first substrate being provided with a first electrode structure and the second substrate being provided with a second electrode structure, and a liquid crystal disposed between said first and second substrates to provide an effective optical modulation region and a peripheral region along at least two sides of the cell structure outside the effective optical modulation region, wherein said first substrate is further provided with an intermediate layer disposed between said first substrate and said first electrode structure in the effective optical region and the peripheral region, and said first electrode structure on the intermediate layer comprises a first electrode disposed at least in the effective optical modulation region and a second electrode disposed in the peripheral region, the first and second electrodes being spaced apart from each other, wherein the intermediate layer comprises a color filter film comprising at least one color segment and a coating later disposed on the color filter film and is disposed on one of the first and second substrates.

2. A device according to claim 1, wherein the first electrode has a pattern corresponding to plural display pixels in the effective optical modulation region as a display region.

3. A device according to claim 1, wherein the color filter film comprises at least three color filter segments comprising a red color filter segment, a green color filter segment, and a blue color filter segment.

4. A device according to claim 1, wherein the intermediate layer further comprises a light-interrupting layer disposed so as to fill a space between a prescribed number of color filter segments in the effective optical modulation region.

5. A device according to claim 1, wherein the intermediate layer further comprises a light-interrupting layer disposed so as to fill a space between a prescribed number of color filter segments in the effective optical modulation region and the peripheral region.

6. A device according to claim 1, wherein the color filter film comprises a first color filter film in the effective optical modulation region and a second color filter film in the peripheral region, the second color filter film comprising at least one color filter segment each of which is larger in size than that of at least one color filter segment constituting the first color filter film.

7. A device according to claim 1, wherein the first and second electrode structures comprise an electroconductive transparent material.

8. A device according to claim 1, wherein the first and second substrates are connected to each other with a sealing agent at a periphery portion therebetween to provide a prescribed cell gap, and the second electrode extends under the sealing agent.

9. A device according to claim 8, wherein the prescribed cell gap is a cell gap of at most 5 $\mu$m.

10. A device according to claim 1, wherein the first electrode and the second electrode have different patterns.

11. A device according to claim 1, wherein the second electrode disposed in the peripheral region is not supplied with a voltage.

12. A device according to claim 1, wherein the liquid crystal comprises a chiral smectic liquid crystal.

13. A device according to claim 1, wherein the second electrode is permanently electrically isolated from the first electrode.

14. A device according to claim 1, wherein the second electrode is disposed in a floating state.

15. A device according to claim 1, wherein the effective optical modulation region includes a plurality of pixels with spacings therebetween.

16. A process for producing a liquid crystal device comprising first and second substrates disposed opposite to each other so as to provide a rectangular cell structure having four sides, the first substrate being provided with a first electrode structure and the second substrate being provided with a second electrode structure, and a liquid crystal disposed between the first and second substrates to provide an effective optical modulation region and a peripheral region along at least two sides of the cell structure outside the effective optical modulation region, said process including the steps of:

forming an intermediate layer on at least the first substrate in the effective optical region and the peripheral region, and forming, on the intermediate layer, the first electrode structure including an electrode having a first electrode pattern in the effective optical modulation region and a second electrode pattern in the peripheral region through a photolithographic process and an etching with an etchant, wherein the first electrode pattern and the second electrode pattern are spaced apart from each other, wherein the intermediate layer comprises a color filter film comprising at least one color segment and a coating later disposed on the color filter film and is disposed on one of the first and second substrates.

17. A process according to claim 16, wherein the etchant comprises a mixture solution of hydroiodic acid and ferric chloride or a mixture solution of hydrochloric acid and ferric chloride.

18. A process according to claim 16, wherein the step of forming the intermediate layer includes the steps of:

forming a color filter film comprising at least one color filter segment on the first substrate, and forming a coating layer on the color filter film.

19. A process according to claim 16, wherein the step of forming the intermediate layer includes the steps of:

forming a color filter film comprising at least one color filter segment on the first substrate, forming a light-interrupting layer so as to fill a space between a prescribed number of color filter segments in the effective optical region and the peripheral region, and forming a coating layer on the light-interrupting layer and the color filter film.

20. A process according to claim 16, wherein the first electrode pattern and the second electrode pattern are separated from each other.

21. A process according to claim 17, wherein the effective optical modulation region includes a plurality of pixels with spacings therebetween.

22. A liquid crystal device, comprising first and second substrates, the first substrate being provided with a first electrode structure and the second substrate being provided with a second electrode structure, and a liquid crystal disposed between said first and second substrates to provide an effective optical modulation region and a peripheral region, wherein the first substrate has an effective optical modulation region and has a peripheral region including a first region and a second region disposed opposite each other via the effective optical modulation region, and the first electrode structure has a first pattern in the form of stripes extending from the effective optical modulation region to an outside portion via the second region to be connected with an external drive unit and has a second pattern in the first region apart from the first pattern and functionally separate from the first pattern.

23. A device according to claim 22, wherein the second pattern comprises plural independent portions each of which is located in an extending direction of the corresponding stripe of the first pattern.

24. A device according to claim 22, wherein the first electrode structure is formed on the first substrate via an intermediate layer disposed in the effective optical modulation region and the first and second regions of the peripheral region.

25. A device according to claim 24, wherein the intermediate layer comprises a color filter film comprising at least one color filter segment, and in the effective optical modulation region, the first and second electrode structures have stripe patterns intersecting with each other to constitute plural display pixels.

26. A device according to claim 25, wherein the color filter film comprises at least three color filter segments comprising a red color filter segment, a green color filter segment, and a blue color filter segment.

27. A device according to claim 25, wherein the intermediate layer further comprises a light-interrupting layer disposed so as to fill a space between a prescribed number of color filter segments in the effective optical modulation region.

28. A device according to claim 25, wherein the intermediate layer further comprises a light-interrupting layer disposed so as to fill a space between a prescribed number of color filter segments in the effective optical modulation region and the first region of the peripheral region.

29. A device according to claim 28, wherein, in the effective optical modulation region, the first and second electrode structures have stripe patterns intersecting with each other to constitute plural display pixels.

30. A device according to claim 22, wherein the first and second electrode structures comprise an electroconductive transparent material.

31. A device according to claim 22, wherein the electrode having the second pattern is not supplied with a voltage in the first region.

32. A device according to claim 22, wherein the liquid crystal device has a cell gap of at most 5 $\mu$m.

33. A device according to claim 22, wherein the liquid crystal comprises a chiral smectic liquid crystal.

* * * * *

UNITED STATES PATENT AND TRADEMARK OFFICE
CERTIFICATE OF CORRECTION

PATENT NO. : 5,936,694

DATED : August 10, 1999

INVENTOR(S) : SUZUKI ET AL.

It is certified that error appears in the above-identified patent and that said Letters Patent is hereby corrected as shown below:

ON THE TITLE PAGE

[56] In References Cited, under OTHER PUBLICATIONS: "Sep. 17, 1987," should read --Sep. 17, 1991,--.

COLUMN 3

Line 18, "attained" should read --been attained--; and
Line 64, "a" should be deleted.

COLUMN 4

Line 27, "3A, 3B" should read --3A and 3B--; and "view" should read --views--.

COLUMN 5

Line 17, "a" should read --an--;
Line 31, "chlorine" should read --a chlorine--; and "a" should be deleted.

UNITED STATES PATENT AND TRADEMARK OFFICE
CERTIFICATE OF CORRECTION

PATENT NO.  : 5,936,694

DATED  : August 10, 1999

INVENTOR(S)  : SUZUKI ET AL.

It is certified that error appears in the above-identified patent and that said Letters Patent is hereby corrected as shown below:

<u>COLUMN 12</u>

Line 1, "claim 17," should read --claim 16,--.

Signed and Sealed this

Eleventh Day of April, 2000

*Attest:*

Q. TODD DICKINSON

*Attesting Officer*   *Director of Patents and Trademarks*